(12) United States Patent
Shoda

(10) Patent No.: US 9,942,429 B2
(45) Date of Patent: Apr. 10, 2018

(54) IMAGE FORMING APPARATUS, IMAGE READING APPARATUS AND IMAGE READING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Hirokazu Shoda, Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 14/989,188

(22) Filed: Jan. 6, 2016

(65) Prior Publication Data

US 2016/0219157 A1    Jul. 28, 2016

Related U.S. Application Data

(63) Continuation of application No. 14/602,349, filed on Jan. 22, 2015, now Pat. No. 9,264,570.

(51) Int. Cl.
*H04N 1/00* (2006.01)
*H04N 1/401* (2006.01)
*H04N 1/12* (2006.01)
*H04N 1/028* (2006.01)

(52) U.S. Cl.
CPC ......... *H04N 1/0057* (2013.01); *H04N 1/0032* (2013.01); *H04N 1/0288* (2013.01); *H04N 1/02885* (2013.01); *H04N 1/125* (2013.01); *H04N 1/1235* (2013.01); *H04N 1/1275* (2013.01); *H04N 1/401* (2013.01); *H04N 2201/0094* (2013.01)

(58) Field of Classification Search
CPC .. H04N 1/0057; H04N 1/0032; H04N 1/0288; H04N 1/02885; H04N 1/1235; H04N 1/125; H04N 1/1275; H04N 1/401; H04N 2201/0094
See application file for complete search history.

(56) References Cited

U.S. PATENT DOCUMENTS 5,771,106 A * 6/1998 Taguchi ................. H04N 1/401
358/406
6,879,730 B1  4/2005 Hirakawa
8,159,726 B2  4/2012 Inage
(Continued)

*Primary Examiner* — Iriana Cruz
(74) *Attorney, Agent, or Firm* — Amin, Turocy & Watson LLP

(57) ABSTRACT

An image forming apparatus comprises an automatic document feeder (ADF); a light source configured to irradiate the document conveyed by the ADF with light; a glass member which can be switched to a first mode in which the light from the light source is transmitted and to a second mode in which the light from the light source is reflected; a signal processing circuit configured to include an image sensor for respectively receiving the reflected light of the document and the glass member, read an image of the document in the first mode and generate a signal of a white reference value based on the reflected light of the glass member in the second mode; and a shading correction circuit configured to correct, based on the signal of the white reference value, image data of the document read such that the brightness in the horizontal scanning direction is uniform.

11 Claims, 5 Drawing Sheets

(56) References Cited

U.S. PATENT DOCUMENTS

| | | | |
|---|---|---|---|
| 2002/0036808 A1* | 3/2002 | Tohyama | H04N 1/0464 |
| | | | 358/497 |
| 2002/0191229 A1 | 12/2002 | Tamamura | |
| 2003/0142367 A1 | 7/2003 | Ito | |
| 2012/0057210 A1* | 3/2012 | Tsukahara | H04N 1/00013 |
| | | | 358/461 |
| 2012/0064265 A1* | 3/2012 | Suh | C03C 17/007 |
| | | | 428/34 |
| 2015/0109651 A1* | 4/2015 | Branda | B32B 17/10761 |
| | | | 359/238 |
| 2015/0244915 A1* | 8/2015 | Kikuchi | H04N 5/265 |
| | | | 348/234 |

\* cited by examiner

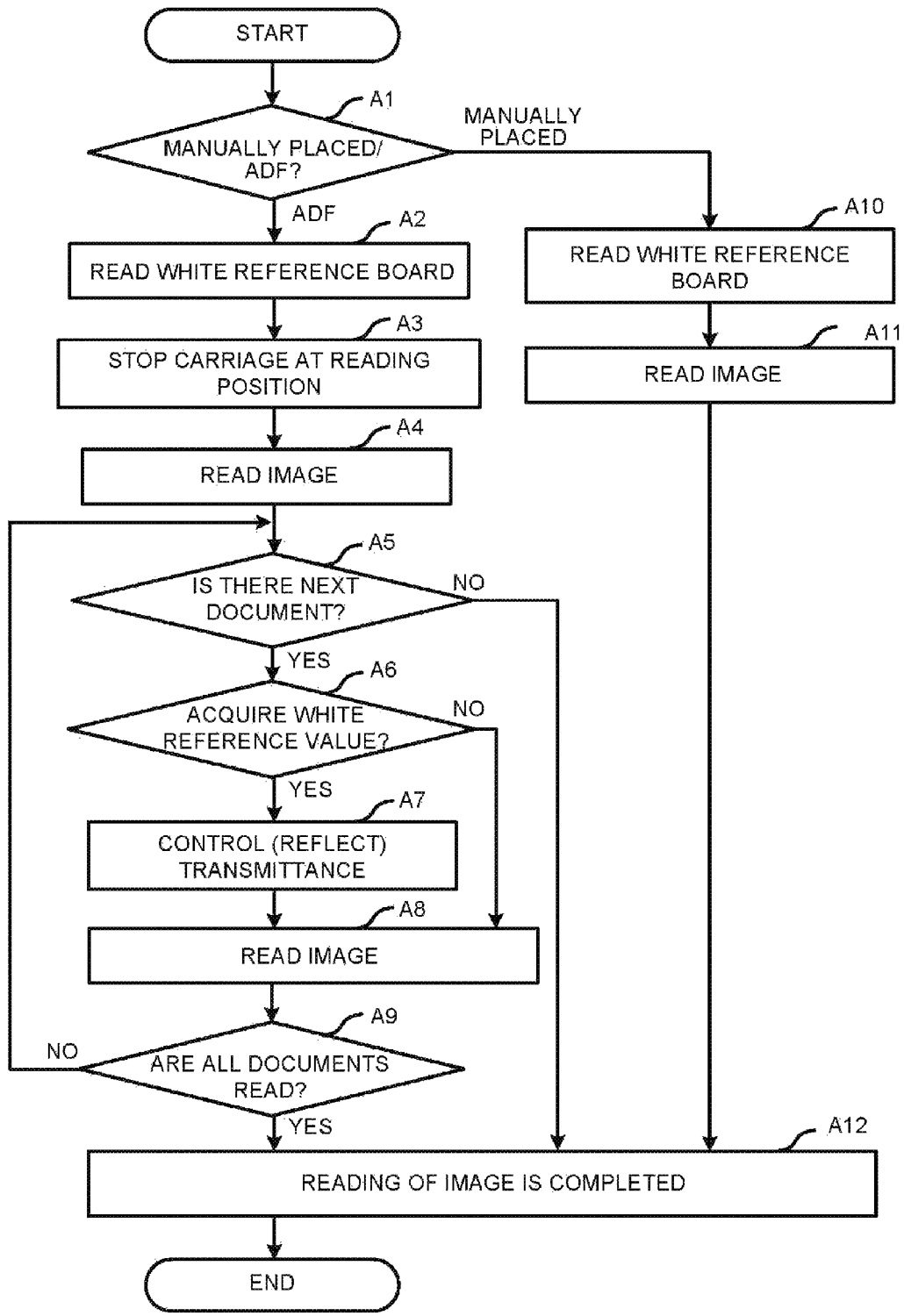

IMAGE FORMING APPARATUS, IMAGE READING APPARATUS AND IMAGE READING METHOD

CROSS-REFERENCE TO RELATED APPLICATION

This application is a Continuation of application Ser. No. 14/602,349 filed on Jan. 22, 2015, the entire contents of which are incorporated herein by reference.

FIELD

Embodiments described herein relate generally to an image forming apparatus such as an MFP (Multi-Function Peripheral) serving as a digital multifunction peripheral, a copier and the like, an image reading apparatus and an image reading method, and a shading correction in a case of continuously reading documents through an automatic document feeder.

BACKGROUND

Conventionally, an image forming apparatus such as an MFP is provided with a scanner section serving as an image reading apparatus and a printer section. The scanner section reads a document. The image data read by the scanner section is printed by the printer section after it is processed by an image processing section.

Further, an automatic document feeder (ADF) is arranged in the image forming apparatus. In the scanner section, there is a case in which the documents sent by the ADF are read, and a case in which the documents placed on a document placing table are read. In general, in a case of copying a large quantity of documents, the scanner section reads the documents sequentially sent by the ADF. On the other hand, in a case of copying images such as a photograph, a book and the like, the scanner section reads the documents placed on the document placing table one by one.

Further, in a case of continuously reading the documents sent by the ADF, a shading correction has been performed for each document. The shading correction is performed such that the brightness distribution in a horizontal scanning direction of the signal input to the image processing section is uniform. The shading correction is performed based on the brightness of the reflected light from a white reference board provided in the scanner section such that the brightness in the horizontal scanning direction is uniform.

Further, the scanner section is provided with a carriage. The carriage includes a light source for illuminating the document, and a mirror for guiding the light reflected by the document to an image sensor. Then, in order to perform the shading correction, the carriage is moved to the position of the white reference board so that the image sensor reads the reflected light of the white reference board.

Thus, in the past, every time reading a document, the carriage needs to be moved to the position of the white reference board so as to perform the shading correction. Therefore, there is a problem that it is not possible to speed up the reading operation of document, and a further improvement is required.

BRIEF DESCRIPTION OF THE DRAWINGS

FIG. 6 is a flowchart illustrating the image reading operations including the shading correction according to the embodiment.

DETAILED DESCRIPTION

Figure 1:
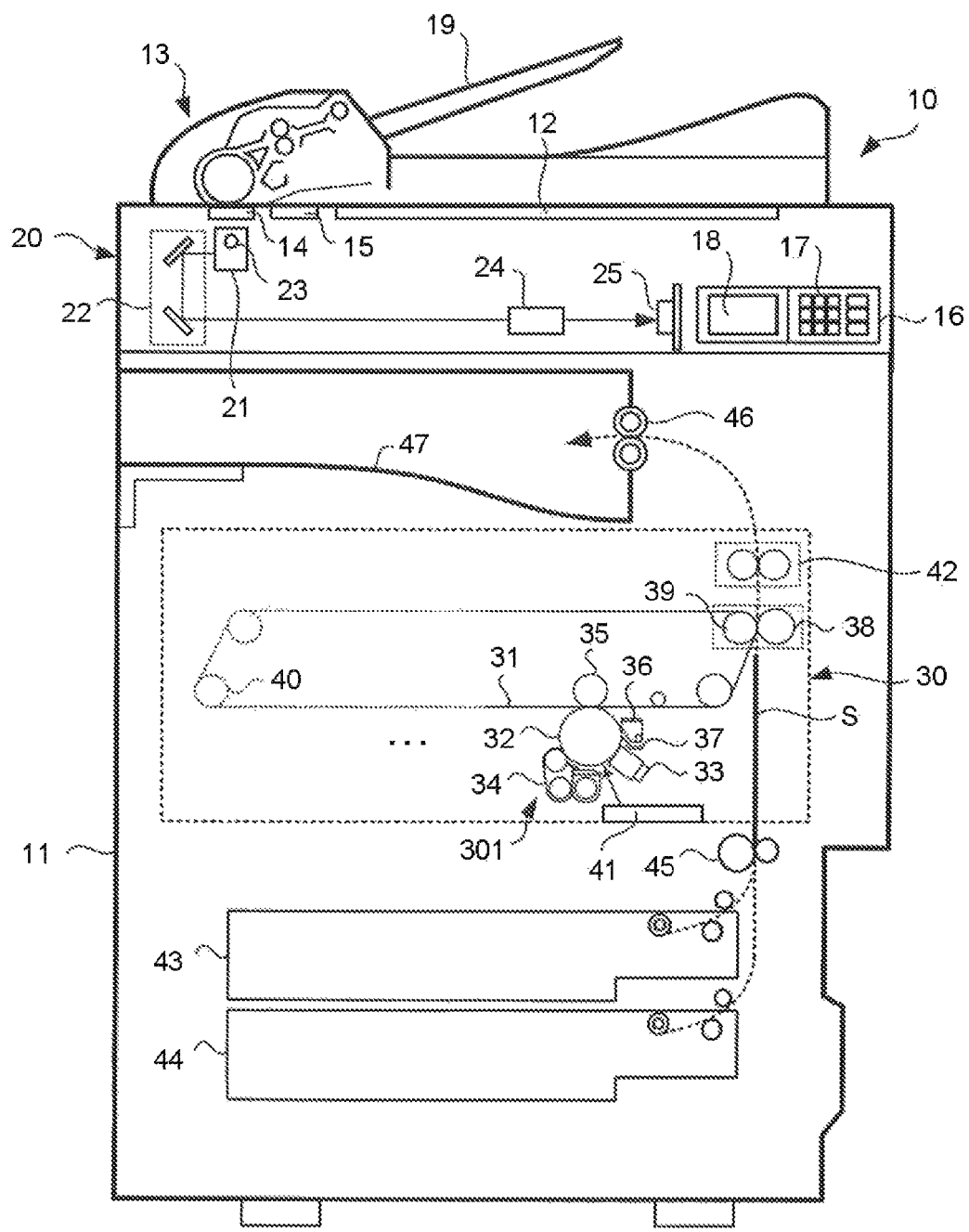
FIG. 1 is a constitution diagram illustrating an image forming apparatus according to one embodiment.

In accordance with an embodiment, an image forming apparatus comprises:

an automatic document feeder (ADF) configured to feed a document automatically;

a light source configured in a horizontal scanning direction to irradiate the document conveyed by the ADF with light;

a control circuit configured to switch, when reading the document, a glass member arranged between the light source and the ADF to a first mode in which the light from the light source is transmitted and to a second mode in which the light from the light source is reflected;

a signal processing circuit configured to include an image sensor for receiving the reflected light of the document and the reflected light of the glass member, read an image of the document in the first mode and generate a signal of a white reference value based on the reflected light of the glass member in the second mode;

a shading correction circuit configured to correct, based on the signal of the white reference value, image data of the document read by the image sensor such that the brightness in the horizontal scanning direction is uniform; and a printer section configured to process the image data corrected by the shading correction circuit to form an image on an image receiving medium.

Hereinafter, an image forming apparatus according to the embodiment is described in detail with reference to the accompanying drawings. Further, same components in each figure are applied with the same reference numerals.

(A First Embodiment)

FIG. 1 is a constitution diagram illustrating an image forming apparatus according to the embodiment. In FIG. 1, an image forming apparatus 10 is, for example, an MFP (Multi-Function Peripheral) serving as a multi-function peripheral, a copier and the like. In the following description, the MFP is exemplified as the image forming apparatus. A document placing table is arranged above a main body 11 of the MFP 10, and an ADF (automatic document feeder) 13 is openably and closably arranged above the document placing table 12. Below the ADF 13 is arranged a glass member 14 capable of controlling the transmittance. Further, a white reference board 15 is arranged between the glass member 14 and the document placing table 12.

Further, above the main body 11 is arranged an operation panel 16 which includes various operation keys 17 and a touch panel type display section 18. A scanner section 20 serving as an image reading apparatus is arranged below the document placing table 12 of the MFP 10. The scanner section 20, which is provided with a first carriage 21 and a second carriage 22, scans and reads the document fed by the ADF 13 or the document placed on the document placing table 12.

A light source 23 for irradiating the document surface is arranged inside the first carriage 21. The light source 23 irradiates the document with light. For example, an LED is used as the light source 23. The LED is arranged to be extended in a horizontal scanning direction (depth direction of paper). The light reflected by the document is reflected by mirrors (later-described in FIG. 2) arranged inside the first carriage 21 and the second carriage 22, and then guided to a CCD (Charge Coupled Device) line sensor 25 via a lens 24.

The CCD line sensor 25 is an image sensor. The reflected light from the document is photoelectrically converted by the CCD line sensor 25. Through the photoelectric conversion, an electrical signal is output from the CCD line sensor 25. The electrical signal output from the image sensor (CCD line sensor 25) is analog processed. The analog-processed electrical signal is converted into a digital signal, and then subjected to an image processing to generate image data.

Further, in a case of reading the documents fed by the ADF 13, the scanner section 20 fixes the first carriage 21 at a position of the glass member 14 (below the ADF 13). The second carriage 22 is also positioned at a position close to the first carriage 21. On the other hand, in a case of reading the documents placed on the document placing table 12, the scanner section 20 moves the first carriage 21 and the second carriage 22 in a vertical scanning direction parallel to the document placing table 12.

The horizontal scanning direction is referred to as a direction orthogonal to the movement direction of the first carriage 21, and is equivalent to the arrangement direction of the CCD line sensor 25. Further, the vertical scanning direction is a direction orthogonal to the horizontal scanning direction.

Further, a printer section 30 is arranged inside the main body 11 of the MFP 10. The printer section 30 includes a photoconductive drum, a laser and the like. The printer section 30 processes the image data read by the scanner section 20 and the image data created by a PC (Personal Computer) and the like to form an image on an image receiving medium. Hereinafter, a paper S is exemplified as the image receiving medium.

The printer section 30 is provided with an image forming section 301 at the lower side of a loop-shaped transfer belt 31. The image forming section 301 scans and exposes the surface of a photoconductive drum 32 with laser beam from a laser unit 41. Through the exposure, an electrostatic latent image is formed on the photoconductive drum 32. The laser unit 41 emits laser light based on the image data read by the scanner section 20. An electrostatic charger 33, a developing device 34, a primary transfer roller 35, a cleaner 36, a blade 37 and the like are arranged around the photoconductive drum 32.

The electrostatic charger 33 uniformly charges the entire surface of the photoconductive drum 32. The developing device 34 is provided with a mixer for stirring the developing agent and a developing roller to which a developing bias is applied. The developing roller supplies a toner of two-component developing agent including toner and carrier to the photoconductive drum 32.

The toner image on the photoconductive drum 32 is transferred to the transfer belt 31 by the primary transfer roller 35. The cleaner 36 removes the toner left on the surface of the photoconductive drum 32 using the blade 37.

The toner image transferred to the transfer belt 31 is transferred to the paper S through a secondary transfer roller 38.

The transfer belt 31, which is stretched by a driving roller 39 and a driven roller 40, is moved cyclically through the rotation of the driving roller 39. The driving roller 39 is arranged to be opposite to the secondary transfer roller 38. When the paper S is passed through a space between the driving roller 39 and the secondary transfer roller 38, a secondary transfer voltage is applied to the paper S by the secondary transfer roller 38. As a result, the toner image on the transfer belt 31 is secondarily transferred to the paper S.

The toner image transferred to the paper S is fixed to the paper S by a fixing device 42 which includes a fixing roller and a pressing roller. When the paper S is passed through the space between the fixing roller and the pressing roller, the paper S is heated and pressed to fix the toner image to the paper S.

In a case of forming a color image, the printer section 30 is provided with a plurality of image forming sections 301 for forming yellow (Y), magenta (M), cyan (C), and black (K) images. The plurality of image forming sections 301 is arranged along the transfer belt 31 from the upstream side to the downstream side below the transfer belt 31. Since the constitutions of the plurality of image forming sections 301 are the same, only one image forming section 301 is shown in FIG. 1. Further, the constitution of the printer section 30, which is not limited to the example described above, may use various methods.

Below the main body 11 is arranged a plurality of cassettes 43, 44. Paper having different sizes is housed in the plurality of cassettes 43, 44. The number of the cassettes is not limited to 2. Further, a conveyance roller 45 is arranged at a position between the cassettes 43, 44 and the secondary transfer roller 38. The conveyance roller 45 conveys the paper S taken out from each of the cassettes 43, 44 to the printer section 30. Further, the paper S (to which the toner image is fixed by the fixing device 42 and on which the image formation is completed) is discharged to a paper discharge section 47 through a paper discharge roller 46.

Figure 2:
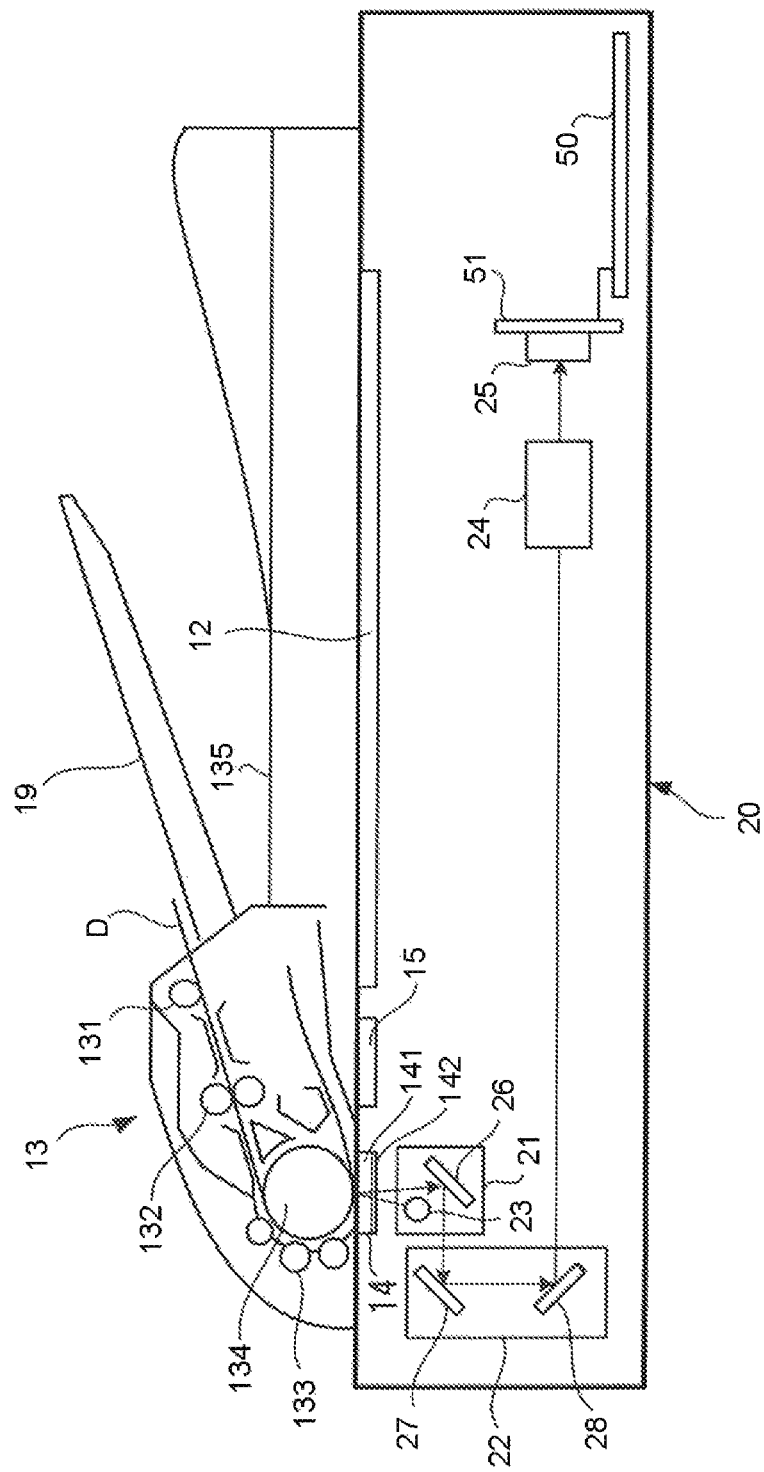
FIG. 2 is an enlarged constitution diagram illustrating an ADF and an image reading apparatus according to the embodiment.

FIG. 2 is an enlarged diagram illustrating the constitutions of the ADF 13 and the scanner section (image reading apparatus) 20. The ADF 13, which is provided with a pickup roller 131, a register roller 132, a conveyance roller 133, a conveyance drum 134, and a document discharge section 135, is openably and closably arranged to face the document placing table 12.

A sheet-like document D set on a tray 19 of the ADF 13 is drawn into the ADF 13 one by one through the rotation of the pickup roller 131. The document D drawn into the ADF 13 is conveyed to the periphery of the conveyance drum 134 by the register roller 132 and the conveyance roller 133. At a position facing the conveyance drum 134, the glass member 14 constituting a document reading window is fixed. Further, the white reference board 15 is arranged at a position (the side of the document placing table 12) deviated from the glass member 14 in the vertical scanning direction.

The scanner section 20 operates in a mode in which an image of the document D conveyed by the ADF 13 is read, and in a mode in which an image of the document D placed on the document placing table 12 is read.

In a case of reading the document D conveyed by the ADF 13, the scanner section 20 fixes the first carriage 21 at a position facing the glass member 14. The second carriage 22 is also positioned at a position close to the first carriage 21. The document D is conveyed at a given speed by a motor for driving the conveyance roller 133 and the like. The document D conveyed from the ADF 13 is irradiated with the light from the light source 23 through the glass member 14. The first carriage 21 includes a reflecting mirror 26 for reflecting the light reflected by the document D towards the second carriage 22. The light reflected by the reflecting mirror 26 is reflected by reflecting mirrors 27, 28 of the second carriage 22, and then guided to the CCD line sensor 25 via the lens 24.

On the other hand, in a case of reading an image of the document D placed on the document placing table 12, the scanner section 20 moves the first carriage 21 and the second carriage 22 in a direction parallel to the document placing table 12 to read the document placed on the document placing table 12. The first carriage 21 and the second carriage 22 are moved at a given speed by a scanning motor.

In a case of reading an image of the document D placed on the document placing table 12, the second carriage 22 is set to a movement speed of V/2 while the first carriage 21 is set to a movement speed of V. Thus, the light-path length from the reading point of the document D to the CCD line sensor 25 is the same.

Figure 3:
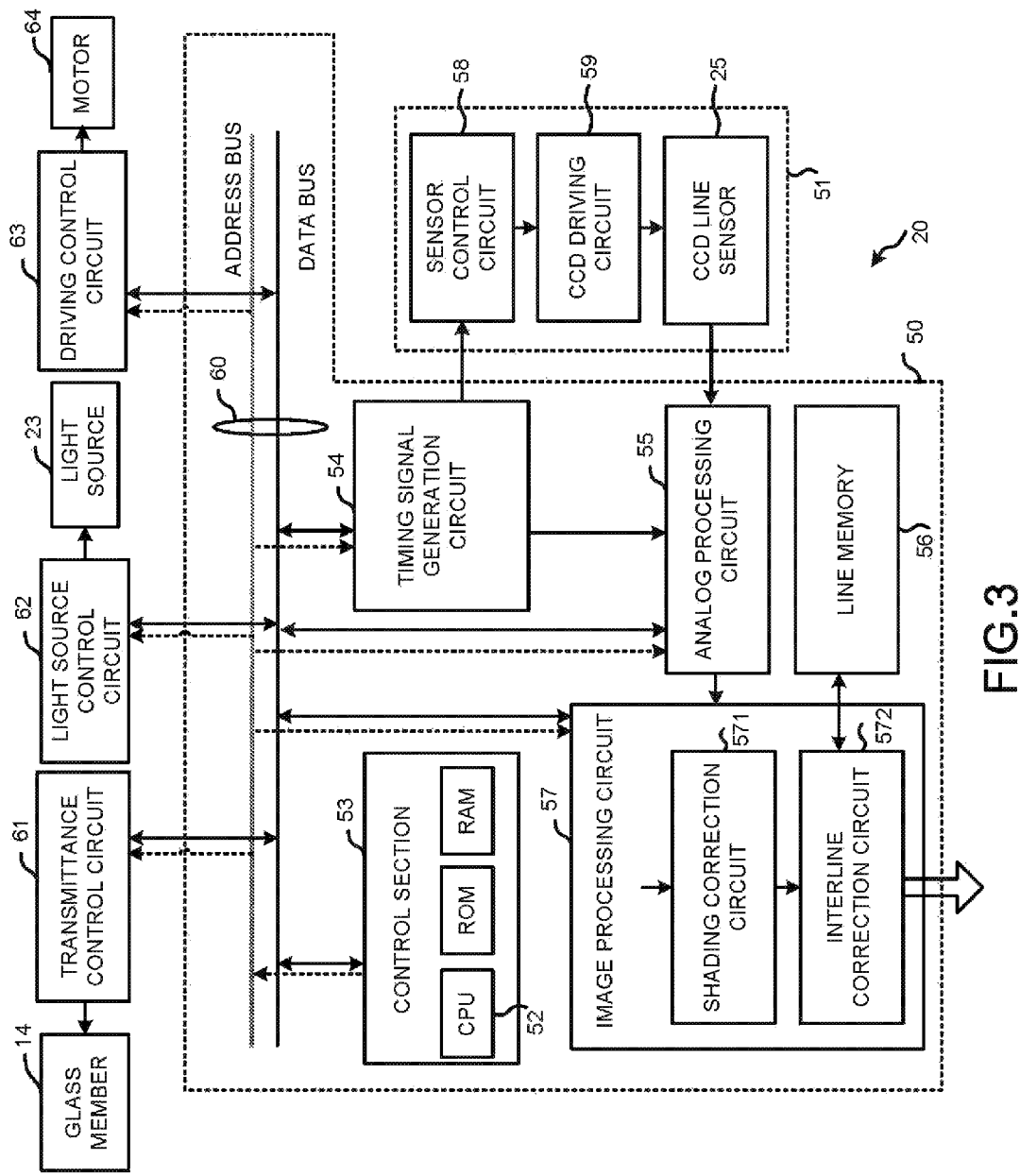
FIG. 3 is a block diagram illustrating the circuit constitution of the image reading apparatus according to the embodiment.

FIG. 3 is a block diagram illustrating the circuit constitution of the scanner section 20 (image reading apparatus) The scanner section 20 is provided with a control substrate 50 and a sensor substrate 51. The control substrate 50 consists of a control section 53, a timing signal generation circuit 54, an analog processing circuit 55, a line memory 56 and an image processing circuit 57. The control section 53 includes a CPU 52, an ROM, an RAM and the like. The timing signal generation circuit 54 generates various timing signals.

The sensor substrate 51 includes a sensor control circuit 58, a CCD driving circuit 59 and the CCD line sensor 25. The CCD line sensor 25 and the analog processing circuit 55 constitute a signal processing circuit. The control section 53 connects with each circuit through a bus line 60 including an address bus and a data bus.

The ROM of the control section 53 stores various programs for controlling the scanner section 20 and the like. The RAM of the control section 53 temporarily stores various variable data and image data. The control section 53 further controls a signal processing system of the CCD line sensor 25. The control section 53 further controls a transmittance control circuit 61, a light source control circuit 62 and a driving control circuit 63. The transmittance control circuit 61 varies the transmittance of the glass member 14. The light source control circuit 62 carries out ON/OFF and the like of the light source 23. Further, the driving control circuit 63 drives a motor 64 used for moving the first carriage 21 and the second carriage 22.

The timing signal generation circuit 54 generates signals required for driving the CCD line sensor 25 such as a sample-and-hold (S/H) signal, a transfer clock and the like. The timing signal generation circuit 54 further generates signals required in various analog processing. The signal generated by the timing signal generation circuit 54 is supplied to the CCD driving circuit 59 after a timing adjustment for the generated signal is carried out by the sensor control circuit 58.

The CCD driving circuit 59 carries out an amplitude level match or a waveform shaping for the signal for driving the CCD line sensor 25 to drive the CCD line sensor 25. The CCD line sensor 25 serves as an image sensor. The CCD line sensor 25 includes three line sensors. On the light receiving surfaces of the three line sensors, a red (R) color filter, a green (G) color filter and a blue (B) color filter are arranged, respectively. The three line sensors photoelectrically convert the light entered each of the line sensors to output image information. The image information is output as an analog signal. The analog signal output from the CCD line sensor 25 is input to the analog processing circuit 55 to carry out an analog processing. In addition, the sensor control circuit 58 may be contained in the timing signal generation circuit 54.

The analog processing circuit 55 constitutes the signal processing circuit together with the CCD line sensor 25. The analog processing circuit 55 is connected with the image processing circuit 57. The image processing circuit 57 comprises an A/D conversion circuit which converts the RGB analog signals output from the CCD line sensor 25 into a digital signal, respectively. The image processing circuit 57 further comprises a shading correction circuit 571 and an interline correction circuit 572. The shading correction circuit 571 processes the digital image data (RGB signal) obtained from the A/D conversion circuit.

That is, the scanner section 20 reads a document to generate a RGB signal by the CCD line sensor 25. However, the CCD line sensors 25 are arranged to be physically separated from each other, and therefore, a sensitivity unevenness of CCD or a light quantity unevenness of light source occurs in the horizontal scanning direction. If the sensitivity unevenness of CCD or the light quantity unevenness of light source occurs, the brightness distribution of the image formed on the paper becomes uneven. Further, a deviation of reading position of the CCD line sensor 25 occurs.

Thus, the unevenness of brightness caused by the sensitivity unevenness of CCD or the unevenness of light source is corrected in the shading correction circuit 571 to uniform the brightness. Further, the interline correction circuit 572 temporarily stores the digital signal corrected in the shading correction circuit 571 in the line memory 56, corrects the physical line deviation of CCD, and then outputs it.

In the image processing circuit 57, in addition to carrying out a shading correction or an interline correction, a processing such as a gradation conversion (Log conversion) is carried out. The processing described above is controlled by the CPU 52. The image data processed in the image processing circuit 57 is subjected to a color conversion processing (conversion to Y, M, C, K signals), a filter processing, a gradation processing and the like by the image processing section in the subsequent stage, and then is output to the laser unit 41. A laser beam is emitted from the laser unit 41 according to image data.

The glass member 14 further includes a glass base material 141 and a film 142 attached to the glass base material 141. The transmittance of the film 142 is variable. The transmittance control circuit 61 applies a voltage to the film 142 to control the transmittance of the film 142. In a case of reading the document D sent from the ADF 13, the transmittance control circuit 61 controls the film 142 to be in a transmitted state. When the film 142 is in the transmitted state, the document D is irradiated with the light from the light source 23.

On the other hand, in a case of carrying out a shading correction during a reading operation of the document D sent by the ADF 13, the transmittance control circuit 61 controls the film 142 to be in a reflected state. When the film 142 is in the reflected state, the light from the light source 23 is reflected by the glass member 14. Thus, the glass member 14 is in either of a transmitted mode and a reflected mode.

Hereinafter, the operations of shading correction are described specifically.

The documents D placed in the ADF 13 are conveyed one by one by the pickup roller 131, the register roller 132 and the conveyance roller 133. If the document D reaches the position facing the glass member 14, the CCD line sensor 25 carries out an image reading. After the image is read, the document D is sent to the document discharge section 135.

That is, the light irradiated from the light source 23 is irradiated to the document D after transmitting the glass member 14 in the scanner section 20. The light reflected by the document D is converged by the lens 24 through the mirrors 26, 27 and 28. The converged light is imaged on the CCD line sensor 25. The CCD line sensor 25 carries out an image reading. The output signal from the CCD line sensor 25 is converted into the image data by the image processing circuit 57 of the control substrate 50.

The shading correction is carried out for correcting the signal input to the image processing circuit 57 such that the brightness distribution in the horizontal scanning direction is uniform. In the shading dorrection, it is general to perform the correction to uniform the brightness in the horizontal scanning direction based on the brightness of the reflected light from the white reference board 15 (that is, the signal of a white reference value).

The following formula (1) shows a general calculation formula of shading correction.

$$\text{img\_out}(x) = \frac{\text{white}(x) - \text{img}(x)}{\text{white}(x) - \text{black}(x)} \times 255 \qquad (1)$$

In the formula (1), x represents a position of a horizontal scanning pixel, white(x) represents a white reference value of the white reference board 15, black(x) represents a black reference value, img(x) represents the image data before shading correction, and img_out(x) represents the image data after shading correction. In addition, the black reference value black(x) is the reference value when the light source 23 is turned off.

Thus, every time the document is read, the scanner section 20 needs to move the first carriage 21 to the position of the white reference board 15 to read the reflected light of the white reference board 15 so as to re-acquire the signal of the white reference value.

In the present embodiment, the transmittance of the film 142 attached to the glass member 14 is varied. That is, in a case of continuously reading the documents D in the ADF 13, the glass member 14 controls in such a manner that the document D is irradiated with the light of the light source 23 in the transmitted mode. Further, in a case of re-acquiring a signal of a white reference value, the glass member 14 controls in such a manner that the light from the light source 23 is reflected by the glass member 14 in the reflected mode. That is, the glass member 14 is in place of the white reference board 15. The scanner section 20 can re-acquire the white reference value merely by varying the transmittance of the glass member 14 without moving the carriage 21. Thus, the document reading operation can be speeded up.

Further, in the following description, the glass member 14 in the transmitted mode is referred to as a transmitting glass, while the glass member 14 in the reflected mode is referred to as a reflecting glass.

Incidentally, the film 142 attached to the glass member 14 and the white reference board 15 shown in FIG. 1 are different in components thereof from each other. Thus, when the reflected light of the white reference board 15 and the reflecting glass 14 is received by the CCD line sensor 25, a difference in the light quantity occurs.

Figure 4:
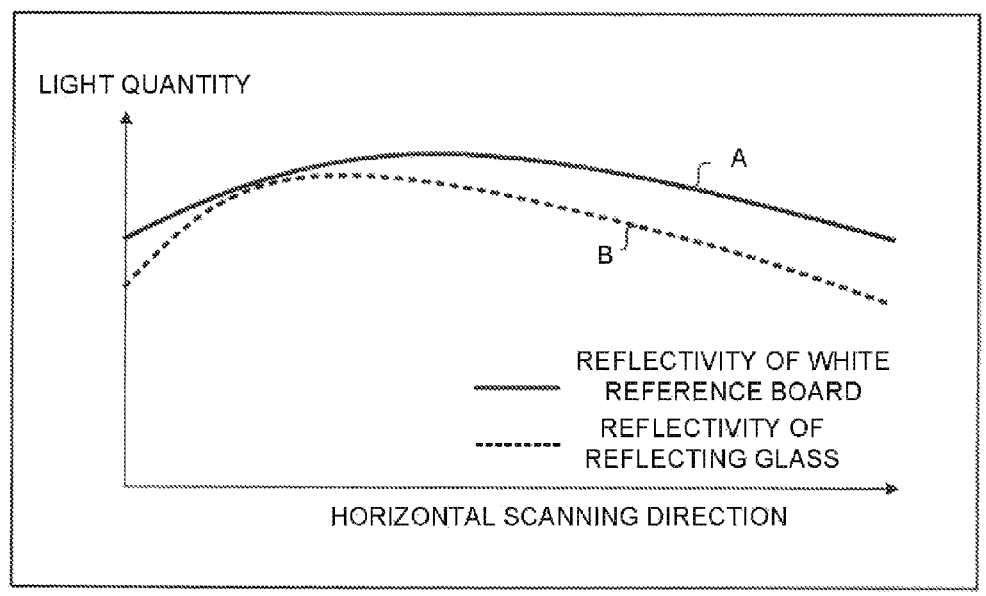
FIG. 4 is a characteristic diagram illustrating an example of the characteristics of the reflected light of a white reference board and the reflected light of a reflecting glass according to the embodiment.

FIG. 4 is a diagram illustrating the characteristics when the image based on the reflected light of the white reference board 15 and the image based on the reflected light of the reflecting glass 14 are read by the CCD line sensor 25. In FIG. 4, the abscissa indicates the horizontal scanning direction, and the ordinate indicates the light quantity. As shown in FIG. 4, for example, in a case where the reflectivity of the reflecting glass 14 is lower than that of the white reference board 15, the reflected light is reduced and the light quantity received by the CCD line sensor 25 is reduced. The characteristic A indicates the reflectivity of the white reference board 15 and the characteristic B indicates the reflectivity of the reflecting glass 14.

Thus, in a case of acquiring a signal of a white reference value based on the reflected light from the reflecting glass 14, the white reference value is smaller than that of the white reference board 15. For this reason, if a shading correction is carried out, the correction amount is increased and a bright image can be obtained.

Thus, in a case where a shading correction is performed using the reflected light of the reflecting glass 14, a correction coefficient coef(x) shown in the following formula (2) is set.

$$\text{img\_out}(x) = \frac{\text{coef}(x) \times \text{white}(x) - \text{img}(x)}{\text{coef}(x) \times \text{white}(x) - \text{black}(x)} \times 255 \qquad (2)$$

In the formula (2), x represents a position of a horizontal scanning pixel, coef(x) represents the correction coefficient, white(x) represents a white reference value of the reflecting glass 14, black(x) represents a black reference value, img(x) represents the image data before shading correction and img_out(x) represents the image data after shading correction.

In a case where the reflecting glass 14 is used as the white reference board, by setting the correction coefficient coef(x) for each one pixel in the horizontal scanning direction, the white reference value to be obtained can be the same as that obtained when reading the white reference board 15 in the original.

The correction coefficient coef(x) further acquires, during the manufacture of the image reading apparatus in advance, the white reference value when reading the white reference board 15 and a white reference value when reading the reflecting glass 14 respectively. Then the correction coefficient coef(x) is calculated according to the following formula (3). The calculated correction coefficient coef(x) is written into a memory arranged inside the control section 53 such as the RAM and the like.

$$\text{coef}(x) = \frac{\text{shd\_white}(x)}{\text{ref\_white}(x)} \qquad (3)$$

In the formula (3), x represents a position of a horizontal scanning pixel, coef(x) represents the correction coefficient, shd_white(x) represents a white reference value of the white reference board 15 and ref_white(x) represents a white reference value of the reflecting glass 14.

Figure 5:
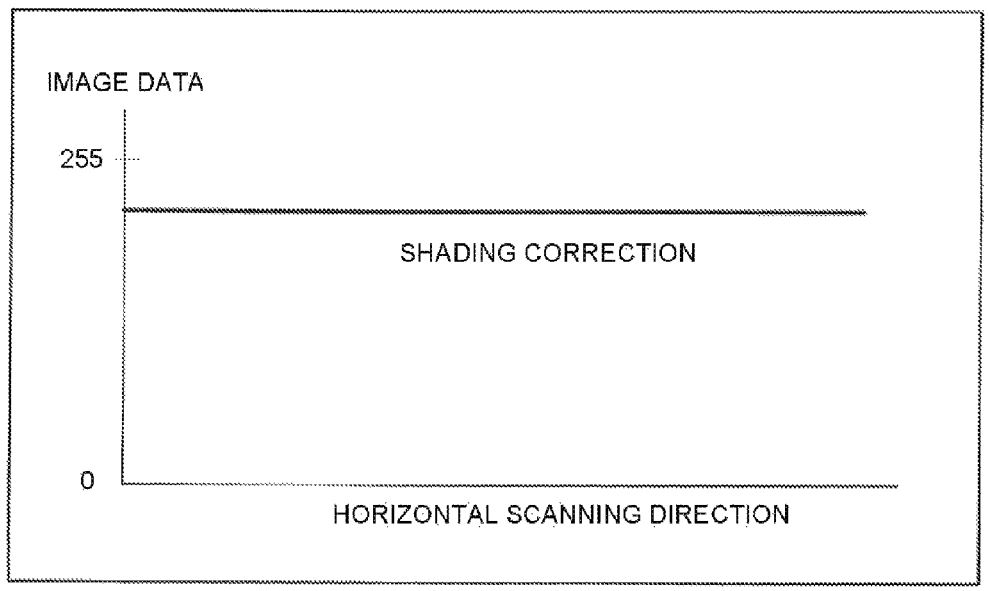
FIG. 5 is an illustration diagram illustrating an example of the image data subjected to a shading correction according to the embodiment.

FIG. 5 shows an example of the image data after the shading correction. As shown in FIG. 5, through the shading correction, the image data is corrected in such a manner that the brightness distribution of the image data at any position in the horizontal scanning direction is uniform.

FIG. 6 is a flowchart illustrating the image reading operations including the shading correction. The CPU 52 controls operations of each section of the image reading apparatus 20 according to the programs stored in the ROM of the control section 53.

In FIG. 6, if a start button on the operation panel 14 is pressed, the CPU 52 determines in ACT A1 whether the document is manually placed or supplied by the ADF 13. If the document D is placed on the tray 19 of the ADF 13, ACT A2 is taken. If there is no document D on the tray 19, when a document is manually placed on the document placing table 12, ACT A10 is taken.

In ACT A2, the CPU 52 controls the scanner section 20 to move the carriage 21 to the position of the white reference board 15. That is, before the document sent from the ADF 13 is read, the reading of the white reference board 15 is carried out only for once to acquire a white reference value for shading correction. In ACT A3, the CPU 52 stops the carriage 21 at a reading position corresponding to the transmitting glass 14.

In ACT A4, the scanner section 20 reads the image of the document D conveyed by the ADF 13. Further, in ACT A4, a shading correction is carried out based on the white reference value of the white reference board 15 acquired in ACT A2. The shading correction is carried out based on the formula (1).

In ACT A5, the CPU 52 determines whether or not there is a next document. When there is no document on the tray 19 of the ADF 13 (NO in ACT A5), it means that the image reading operation is completed (ACT A12). When there remains a document on the tray 19 of the ADF 13 (YES in ACT A5), ACT A6 is taken.

In ACT A6, the CPU 52 determines whether or not to re-acquire a white reference value. The determination of ACT A6 is, for example, to determine whether or not the number of the read documents reaches a preset number (e.g. 10), or to determine whether or not a preset time (sec.) from the beginning of the reading of the initial document elapses.

That is, if the temperature of the light source 23 is increased, the sensitivity unevenness of CCD or the light quantity unevenness of light source varies. If the energization time is long, there is a tendency that the temperature of the light source 23 is increased. Thus, if the number of the conveyed documents reaches the preset number, the reflected light of the reflecting glass 14 is read to re-acquire the white reference value. Alternatively, every time a preset time from the beginning of the reading of document elapses, the reflected light of the reflecting glass 14 is read to re-acquire the white reference value.

If it is determined in ACT A6 that the white reference value is acquired, ACT A7 is taken. If it is determined in ACT A6 that the white reference value is not acquired, ACT A8 is taken.

In ACT A7, the transmittance control circuit 61 applies a voltage to the film 142 of the glass member 14 to control the transmittance. In ACT A7, the film 142 is in the reflected state and the glass member 14 is set to be in a state of the reflecting glass. Further, the CPU 52 controls the scanner section 20 to read the reflected light of the reflecting glass 14 to acquire the white reference value in ACT A7.

In ACT A8, the scanner section 20 carries out reading of the image of the documents that are sequentially conveyed. Further, the shading correction circuit 571 carries out a shading correction using the acquired white reference value in ACT A8. The shading correction circuit 571 carries out the shading correction based on the white reference value acquired last time until next time the scanner section 20 reads the reflected light of the reflecting glass 14 to re-acquire a white reference value.

Thus, initially, the shading correction is carried out based on the formula (1) using the white reference value acquired in ACT A3. Further, in a case of carrying out a shading correction using the white reference value re-acquired in ACT A7, it is carried out based on the formula (2). In ACT A6, for example, every time the preset number of document is conveyed, a signal of the white reference value based on the reflecting glass 14 is acquired and updated.

In ACT A9, the CPU 52 determines whether or not all documents are read. In a case where there is a document left, the processing returns to ACT A5. If it is determined that all documents are read, the reading of image is completed in ACT A12.

On the other hand, in ACT A1, if the document manually placed on the document placing table 12 is read, only one document is scanned. Thus, the scanner section 20 reads the white reference board 15 to acquire a white reference value in ACT A10. Then, the scanner section 20 reads the image of the document in ACT A11. Then, the shading correction circuit 571 carries out a shading correction of the read image data based on the white reference value of the white reference board 15 in ACT A11. In ACT A11, the shading correction is carried out according to the formula (1) based on the white reference value of the white reference board 15. If the reading of image in ACT A11 is ended, the reading of the image in ACT A12 is completed.

According to the embodiments described above, when reading the documents sequentially sent from the ADF 13, the image forming apparatus controls in such a manner that the transmittance of the glass member 14 is varied to make the glass member 14 in either of the transmitted mode and the reflected mode. In this way, the white reference value of the reflecting glass 14 can be acquired and updated periodically. Further, the shading correction circuit 571 can accurately carry out the shading correction based on the updated white reference value. In addition, the scanner section 20 can greatly reduce the number of movements of the carriage 21, thereby speeding up the reading of the document.

Further, the present invention is not limited to the embodiments described above, and various applications are possible. For example, a scanning head including an LED element can also be used in replace of the laser unit 41.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:
1. An image forming apparatus, comprising:
   an automatic document feeder (ADF) configured to feed a document automatically;
   a light source configured to irradiate the document conveyed by the ADF with light;
   a carriage capable of moving the light source;
   a glass member arranged between the light source and the ADF, the glass member including a glass base material and a film which is attached to the glass base material, the film having a variable transmittance which can be controlled, and the light from the light source is transmitted or the light from the light source is reflected;

a control circuit configured to switch, when reading the document, the glass member to a first mode in which the light from the light source is transmitted and to a second mode in which the light from the light source is reflected;

an image sensor for receiving the reflected light of the document and the reflected light of the glass member;

a shading correction circuit configured to correct, based on a signal of a white reference value based on the reflected light of the glass member, image data of the document read by the image sensor such that brightness orthogonal to a moving direction of the carriage is uniform; and a white reference board configured at a position deviated from the glass member in a moving direction of the carriage.

2. The image forming apparatus of claim 1, further comprising:
a signal processing circuit configured to include the image sensor, read an image data of the document in the first mode and generate the signal of the white reference value based on the reflected light of the glass member in the second mode; and
a printer section configured to process the image data corrected by the shading correction circuit to form an image on an image receiving medium.

3. The apparatus of claim 1,
the control circuit configured to switch the film of the glass member to either of a transmitted state and a reflected state by switching a voltage applied to the film.

4. The apparatus of claim 1,
the control circuit switching, every time the number of the documents conveyed by the ADF reaches a preset number, or every time a preset time from the beginning of the conveyance of document elapses, the glass member to a second mode.

5. The apparatus of claim 2, further comprising:
a driving control circuit configured to control in such a manner that the carriage is driven to enable the light from the light source to enter the white reference board, and the reflected light of the white reference board is input to the image sensor,
the signal processing circuit generating a signal of a first white reference value based on the reflected light from the white reference board, and meanwhile, generating a signal of a second white reference value based on the reflected light from the glass member, and
the shading correction circuit calculating a correction coefficient corresponding to the ratio of the first white reference value to the second white reference value, and then multiplying the correction coefficient by the second white reference value to carry out the shading correction.

6. The apparatus of claim 5, further comprising:
a document placing table on which documents are placed;
the shading correction circuit carrying out a shading correction based on the signal of the first white reference value when a document is manually placed on the document placing table.

7. An image reading apparatus, comprising:
a light source configured to irradiate the document conveyed by an automatic document feeder (ADF) with light;
a carriage capable of moving the light source;
a glass member arranged between the light source and the ADF, the glass member including a glass base material and a film which is attached to the glass base material, the film having a variable transmittance which can be controlled, and the light from the light source is transmitted or the light from the light source is reflected;

a control circuit configured to switch, when reading the document, the glass member to a first mode in which the light from the light source is transmitted and to a second mode in which the light from the light source is reflected;

an image sensor for receiving the reflected light of the document and the reflected light of the glass member;

a signal processing circuit configured to include the image sensor, read an image of the document in the first mode and generate a signal of a white reference value based on the reflected light of the glass member in the second mode;

a shading correction circuit configured to correct, based on the signal of the white reference value, image data of the document read by the image sensor such that the brightness orthogonal to a moving direction of a carriage is uniform; and a white reference board configured at a position deviated from the glass member in a moving direction of the carriage.

8. The apparatus of claim 7,
wherein the control circuit is further configured to switch the film to either of a transmitted state and a reflected state by switching a voltage applied to the film.

9. The apparatus of claim 7, further comprising:
a driving control circuit configured to control in such a manner that the carriage is driven to enable the light from the light source to enter the white reference board, and the reflected light of the white reference board is input to the image sensor,
the signal processing circuit generating a signal of a first white reference value based on the reflected light from the white reference board, and meanwhile, generating a signal of a second white reference value based on the reflected light from the glass member, and
the shading correction circuit calculating a correction coefficient corresponding to the ratio of the first white reference value to the second white reference value, and then multiplying the correction coefficient by the second white reference value to carry out the shading correction.

10. An image reading method, including:
arranging a light source inside a carriage capable of moving;
irradiating a document conveyed by an automatic document feeder (ADF) with light from the light source;
arranging a glass member between the light source and the ADF, the glass member including a glass base material and a film which is attached to the glass base material, the film having a variable transmittance which can be controlled, and the light from the light source is transmitted or the light form the light source is reflected;
controlling the glass member of which the transmittance is variable to switch, when reading the document, the glass member to a first mode in which the light from the light source is transmitted and to a second mode in which the light from the light source is reflected;
receiving the reflected light of the document and the reflected light of the glass member with an image sensor, reading an image of the document in the first mode and generating a signal of a white reference value based on the reflected light of the glass member in the second mode; and correcting, based on the signal of the white reference value, image data of the document read by the image sensor such that brightness orthogonal to a moving direction of a carriage is uniform.

11. The method of claim 10, further comprising:

arranging a white reference board at a position deviated from the glass member, and controlling in such a manner that the carriage is driven to enable the light from the light source to enter the white reference board, and the reflected light of the white reference board is input to the image sensor;

generating a signal of a first white reference value based on the reflected light from the white reference board, and meanwhile, generating a signal of a second white reference value based on the reflected light from the glass member; and calculating a correction coefficient corresponding to the ratio of the first white reference value to the second white reference value, and multiplying the correction coefficient by the second white reference value to carry out the shading correction.

* * * * *